(12) United States Patent
Cochren et al.

(10) Patent No.: US 9,453,569 B2
(45) Date of Patent: Sep. 27, 2016

(54) LOCKING DIFFERENTIAL HAVING PRELOAD SPRING WEAR PADS

(71) Applicant: EATON CORPORATION, Cleveland, OH (US)

(72) Inventors: Steven J. Cochren, Commerce, MI (US); Christopher W. Creager, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 96 days.

(21) Appl. No.: 14/575,537

(22) Filed: Dec. 18, 2014

(65) Prior Publication Data

US 2015/0105209 A1    Apr. 16, 2015

Related U.S. Application Data

(63) Continuation of application No. PCT/US2013/072185, filed on Nov. 27, 2013.

(60) Provisional application No. 61/730,560, filed on Nov. 28, 2012.

(51) Int. Cl.
*F16H 48/12* (2012.01)
*F16H 48/22* (2006.01)
(Continued)

(52) U.S. Cl.
CPC .............. *F16H 48/22* (2013.01); *F16H 48/08* (2013.01); *F16H 48/145* (2013.01); *F16H 2048/207* (2013.01)

(58) Field of Classification Search
CPC .... F16H 48/08; F16H 2048/085; F16H 1/14; F16H 1/222
USPC .................................................. 74/650, 665 F
See application file for complete search history.

(56) References Cited

U.S. PATENT DOCUMENTS 3,186,258 A    6/1965    Meldola
3,249,186 A    5/1966    Kluwe
(Continued)

FOREIGN PATENT DOCUMENTS

EP    0 091 747 A2    10/1983
EP    0 838 612 A2    4/1988
(Continued)

OTHER PUBLICATIONS

International Search Report for corresponding International Patent Application No. PCT/US2013/072185 mailed Mar. 20, 2014.
(Continued)

*Primary Examiner* — Ha D Ho
(74) *Attorney, Agent, or Firm* — Merchant & Gould P.C.

(57) ABSTRACT

A locking differential for a vehicle includes a rotatable housing and a differential mechanism supported in the housing. The differential mechanism includes a pair of clutch members wherein each of the clutch members presents an inwardly directed face. Each face includes a groove disposed in spacing relationship with respect to the other. A cross pin is received in each groove and is operatively connected for rotation with the housing. At least one biasing member is disposed between the clutch members and at least one wear pad is disposed at an end of the at least one biasing member to preload the at least one biasing member and to allow the at least one biasing member to be acted upon by only a single one of the clutch members.

25 Claims, 4 Drawing Sheets

(51) Int. Cl.
  *F16H 48/08* (2006.01)
  *F16H 48/14* (2006.01)
  *F16H 48/20* (2012.01)

(56) References Cited

U.S. PATENT DOCUMENTS

| | | | |
|---|---|---|---|
| 3,253,483 | A | 5/1966 | McCaw |
| 3,264,900 | A | 8/1966 | Hartupee |
| 3,596,740 | A | 8/1971 | Nau |
| 3,611,833 | A | 10/1971 | Baremor |
| 3,886,813 | A | 6/1975 | Baremor |
| 3,906,812 | A | 9/1975 | Kagata |
| 4,136,582 | A | 1/1979 | Boor |
| 4,304,397 | A | 12/1981 | Zanow |
| 4,498,355 | A | 2/1985 | Schou |
| 4,735,108 | A | 4/1988 | Teraoka et al. |
| 4,754,661 | A | 7/1988 | Barnett |
| 4,845,831 | A | 7/1989 | Schou |
| 4,865,173 | A | 9/1989 | Leigh-Monstevens et al. |
| 4,903,809 | A | 2/1990 | Kiblawi et al. |
| 4,939,953 | A | 7/1990 | Yasui |
| 4,978,329 | A | 12/1990 | Yasui et al. |
| 5,019,021 | A | 5/1991 | Janson |
| 5,413,015 | A | 5/1995 | Zentmyer |
| 5,441,131 | A | 8/1995 | Mayer et al. |
| 5,603,397 | A | 2/1997 | Meyers |
| 5,715,733 | A | 2/1998 | Dissett |
| 5,727,430 | A | 3/1998 | Valente |
| 5,823,908 | A | 10/1998 | Stefanek |
| 5,901,618 | A | 5/1999 | Tyson et al. |
| 5,967,276 | A | 10/1999 | Leichliter et al. |
| 5,971,120 | A | 10/1999 | Bessemer et al. |
| 6,062,105 | A | 5/2000 | Tyson et al. |
| 6,083,134 | A | 7/2000 | Godlew |
| 6,102,178 | A | 8/2000 | Walton |
| 6,105,465 | A | 8/2000 | Tyson et al. |
| 6,374,701 | B1 | 4/2002 | Tittjung |
| 6,394,927 | B1 | 5/2002 | Bongard |
| 6,463,830 | B1 | 10/2002 | Ito et al. |
| 6,491,126 | B1 | 12/2002 | Robison et al. |
| 6,607,062 | B1 | 8/2003 | Heatwole et al. |
| 6,688,194 | B2 | 2/2004 | Dissett et al. |
| 6,884,196 | B1 | 4/2005 | Ziech |
| 7,104,912 | B2 | 9/2006 | Morgensai |
| 7,178,420 | B2 | 2/2007 | Barth |
| 7,178,427 | B2 * | 2/2007 | Christensen .......... F16H 37/041 74/424.7 |
| 7,264,569 | B2 | 9/2007 | Fox |
| 7,303,045 | B2 * | 12/2007 | Yamamori ............. B62D 5/008 180/444 |
| 7,311,632 | B2 | 12/2007 | Dissett et al. |
| 7,361,115 | B2 | 4/2008 | Morgensai |
| 7,823,711 | B2 | 11/2010 | Uhler et al. |
| 7,874,954 | B2 | 1/2011 | Dissett et al. |
| 7,905,317 | B2 * | 3/2011 | Kruttschnitt .......... B62D 5/008 180/443 |
| 8,146,458 | B2 | 4/2012 | Radzevich |
| 8,360,178 | B2 * | 1/2013 | Goldenberg ............. B25J 5/005 180/65.8 |
| 2002/0132694 | A1 | 9/2002 | Okazaki |
| 2003/0066386 | A1 | 4/2003 | Dissett et al. |
| 2004/0237689 | A1 | 12/2004 | Hiltbrand |
| 2005/0288144 | A1 | 12/2005 | Wang et al. |
| 2008/0060474 | A1 | 3/2008 | Mizukawa et al. |
| 2008/0103008 | A1 | 5/2008 | Gleasman et al. |
| 2008/0176703 | A1 | 7/2008 | Hoberg |
| 2008/0190240 | A1 | 8/2008 | Dissett et al. |
| 2009/0011890 | A1 | 1/2009 | Bawks |
| 2010/0113208 | A1 | 5/2010 | Haugeberg |
| 2010/0276243 | A1 | 11/2010 | Arhab et al. |
| 2011/0021304 | A1 | 1/2011 | Radzevich |
| 2011/0021306 | A1 | 1/2011 | Radzevich |
| 2014/0141920 | A1 | 5/2014 | Creager |
| 2014/0162828 | A1 | 6/2014 | Creager |
| 2014/0171252 | A1 | 6/2014 | Creager |
| 2014/0262668 | A1 | 9/2014 | Creager |
| 2015/0105209 | A1 | 4/2015 | Cochren et al. |

FOREIGN PATENT DOCUMENTS

| | | |
|---|---|---|
| EP | 0 686 333 A1 | 11/1995 |
| EP | 1 767 817 A1 | 3/2007 |
| EP | 1 898 124 A2 | 3/2008 |
| FR | 769 239 A | 8/1934 |
| FR | 2 382 627 A1 | 9/1978 |
| WO | 2005/111471 A1 | 11/2005 |

OTHER PUBLICATIONS

International Search Report and Written Opinion for PCT/US2013/056585 mailed Apr. 17, 2014.
Invitation to pay Additional Fees with Partial International Search Report for PCT/US2013/056585 mailed Jan. 21, 2014.
"Series and parallel springs", Wikipedia excerpt from Keith Symon (1971), Mechanics. Addison-Wesley, ISBN 0-201-07392-7.
Invitation to Pay Additional Fees with Partial International Search Report for PCT/US2013/056586 mailed Jan. 30, 2014.
International Search Report and Written Opinion for PCT/US2013/056586 mailed Apr. 11, 2014.

* cited by examiner

LOCKING DIFFERENTIAL HAVING PRELOAD SPRING WEAR PADS

CROSS-REFERENCE TO RELATED APPLICATION

This application is a Continuation of PCT/US2013/072185, filed on 27 Nov. 2013, which claims benefit of U.S. Patent Application Ser. No. 61/730,560 filed on 28 Nov. 2012, and which applications are incorporated herein by reference. To the extent appropriate, a claim of priority is made to each of the above disclosed applications.

BACKGROUND

1. Field

The present teachings relate generally to locking differentials for vehicles and, more specifically, to features of a locking differential having preload spring wear pads.

2. Description of the Related Art

Locking differentials of the type contemplated by the present teachings are employed as a part of a drive train and generally include a pair of clutch members supported for rotation in a housing. A pair of side gears are splined for rotation to corresponding axle half shafts. A clutch mechanism is interposed between the clutch members and the side gears. A cross pin is operatively mounted for rotation with the housing and is received in a pair of opposed grooves formed on the inwardly facing surfaces of the clutch members. In an event requiring differential rotation between the axle half shafts, such as cornering, the higher speed axle shaft advances its clutch to an over-running condition, decoupling it from the powertrain torque. If the driving terrain provides insufficient traction to activate the over-running feature of the locking differential, or while driving in a straight line, torque is applied equally to both axle shafts.

While locking differentials of this type have generally worked for their intended purposes, certain disadvantages remain. More specifically, internally pre-loaded locking differentials typically use compression springs to provide the necessary slip resistance on the clutch packs to energize a ramping effect of the clutch members to cross pin interface. Given the required relative motion between the clutch members, the compression spring is "worked" between the two components. This motion causes "sliding" wear to both the compression spring and the clutch members. The interaction can also cause binding of the coils of the compression spring to the edges of the corresponding cavity or pocket. These conditions result in unintended forces acting within the interface that can increase the propensity of the differential being damaged.

Thus, there remains a need in the art for a locking differential that is designed so as to achieve control of the interaction of the clutch members and compression springs, thereby providing for smoother operation and reduced spring binding and breakage.

SUMMARY

One aspect of the present disclosure relates to structures for reducing wear of pre-load springs in a differential.

Another aspect of the present disclosure relates to a differential that uses end cap structures (i.e., wear pads) to allow springs of the differential to apply pre-load forces between components of the differential while being completely enclosed/retained in a cavity (e.g., opening, hole, passage, etc.) defined by only one of the components.

A further aspect of the present disclosure relates to a locking differential for a vehicle including a rotatable housing and a differential mechanism supported in the housing. The differential mechanism includes a pair of clutch members disposed in spaced axial relationship with respect to one another and operatively supported for rotation with the housing. A pair of side gears is operatively adapted for rotation with a corresponding pair of axle half shafts. A pair of clutch mechanisms is operatively disposed between each corresponding pair of clutch members and the side gears. The clutch members are axially moveable within the housing to engage a respective one of the clutch mechanisms to couple the axle half shafts together in the event of a predetermined amount of differential movement between the axle half shafts. Each of the clutch members presents an inwardly directed face. Each face includes a groove disposed in facing relationship with respect to the other. A cross pin is received in each groove and operatively connected for rotation with the housing. At least one biasing member is disposed between the clutch members and at least one wear pad is disposed at the end of the at least one biasing member to preload the at least one biasing member and to allow the at least one biasing member to be acted upon by only a single clutch member.

In one aspect of the present teachings, by placing substantially cylindrical "wear pads" at the end of the compression springs, the compression springs are allowed to be acted upon by only a single clutch member. The "wear pad" is piloted within a bore of the compression spring, which provides a "length over distance" advantage to prevent "shear" or "wedging" effects. This also allows for an intentional and engineered contact at the sliding interface between the clutch member and the cross pin.

BRIEF DESCRIPTION OF THE DRAWINGS

Other aspects of the present teachings will be readily appreciated, as the same becomes better understood after reading the subsequent description taken in connection with the accompanying drawings wherein.

DETAILED DESCRIPTION

Figure 1:
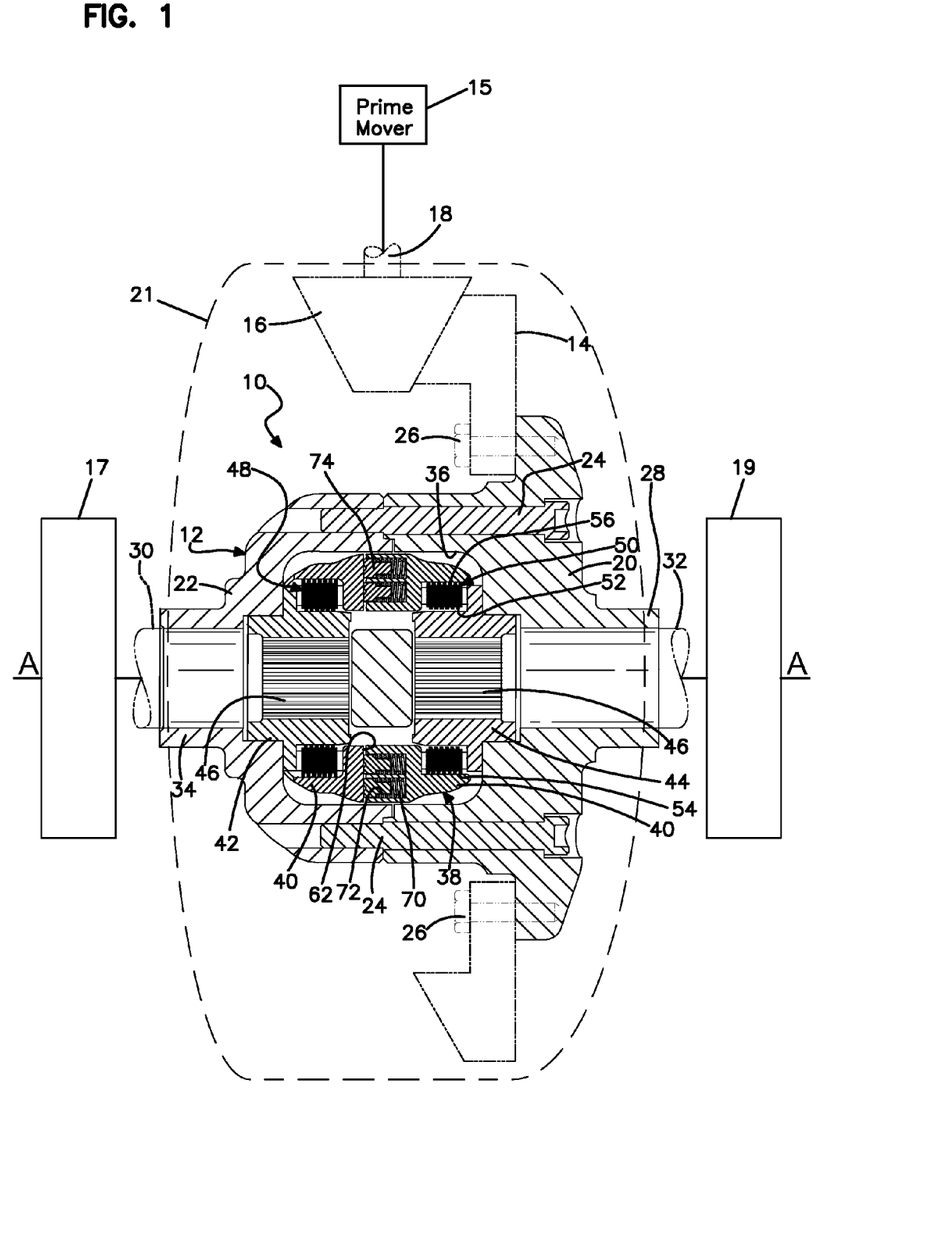
FIG. 1 is a cross-sectional side view of a locking differential of the present teachings illustrating a differential mechanism with preload spring wear pads and a drive shaft, pinion gear and ring gear of the drive train in phantom.
Figures 2, 3:
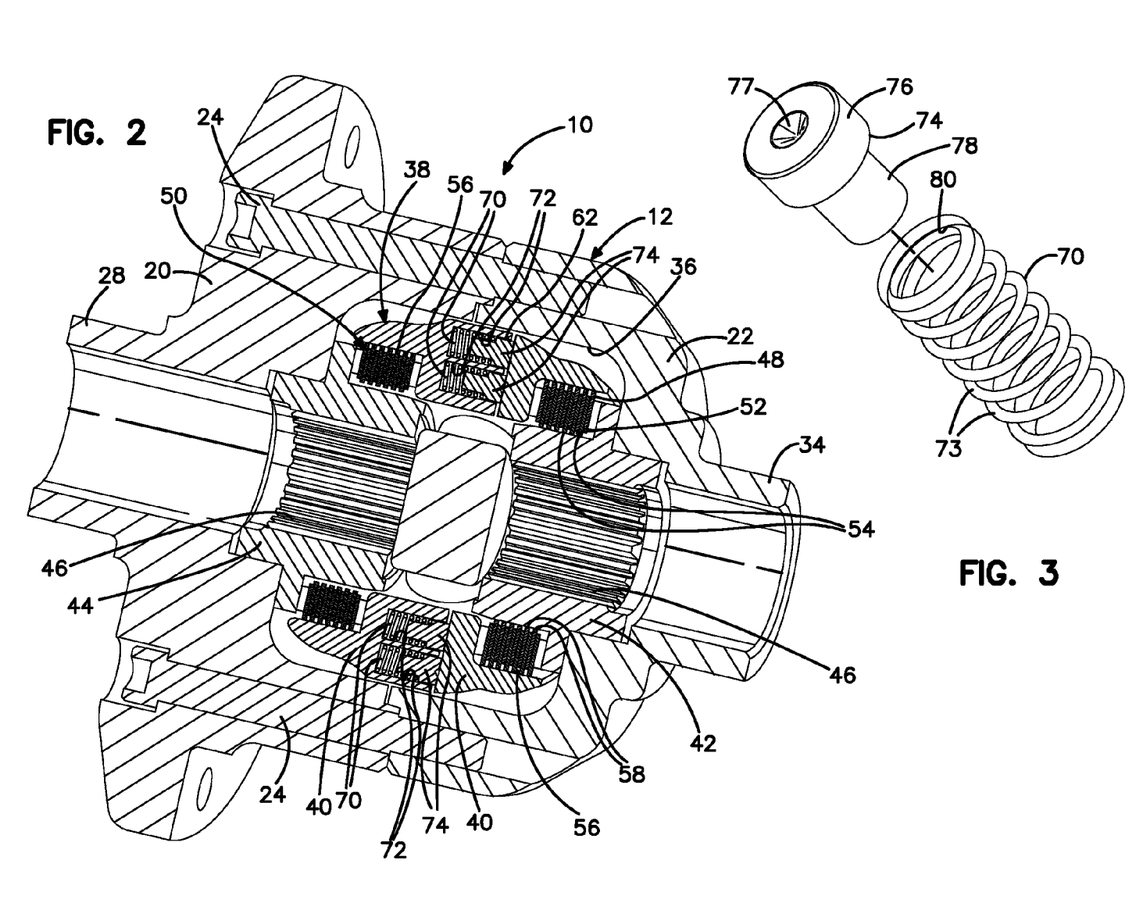
FIG. 2 is a fragmentary perspective view of a locking differential of the present teachings illustrating a differential mechanism with preload spring wear pads.
FIG. 3 is an exploded perspective view of the preload spring wear pad and spring arrangement of the present teachings.

One representative example of a locking differential of the type contemplated by the present teachings is generally indicated at 10 in FIGS. 1 and 2. The locking differential 10 is designed to be employed as a part of a drive train for any number of vehicles having a power plant that is used to provide motive force to the vehicle, for example, an automotive vehicle.

FIG. 1 illustrates an axle assembly incorporating the differential 10. The axle assembly is part of a drive train used to transfer torque from a prime mover 15 (e.g., an engine, a motor, or like power source) to left and right wheels 17, 19. The differential 10 includes a differential housing 12 (i.e., a differential case) and a differential mechanism 38 (i.e., a differential torque transfer arrangement) positioned within the differential housing 12. The differential housing 12 carries a gear 14 (e.g., a ring gear) that intermeshes with a drive gear 16 driven by a driveshaft 18 of the drivetrain. The differential mechanism 38 is configured to transfer torque from the differential housing 12 to left and right axle shafts (e.g., half axle shafts) 30, 32 that respectively correspond to the left and right wheels 17, 19.

The differential 10 is enclosed within an axle housing 21 that protects the differential 10 and contains lubricant (e.g., oil) for lubricating moving parts within the axle housing 21. The differential housing 12 is mounted to rotate relative to the axle housing 21 about an axis of rotation A. In one example, bearings can be provided between the differential housing 12 and the axle housing 21 to allow the differential housing 12 to freely rotate about the axis of rotation A relative to the axle housing 21. The left and right axle shafts 30, 32 are co-axially aligned along the axis of rotation A.

In certain examples, the axle assembly can be incorporated into a vehicle, such as an all-terrain vehicle, a light utility vehicle, or other type of vehicle. The differential 10 of the axle assembly is configured to prevent or inhibit individual wheel spin and to provide enhanced traction performance on a variety of surfaces such as mud, wet pavement, loose dirt and ice. In use, torque for rotating the differential housing 12 about the axis of rotation A is provided by the drive gear 16 that intermeshes with the ring gear 14 carried by the differential housing 12. The differential mechanism 38 includes left and right clutches (e.g., disc-style clutches) configured to transfer torque from the rotating differential housing 12 to the left and right axle shafts 30, 32 thereby driving rotation of the left and right wheels 17, 19.

When the vehicle is driven straight, the left and right clutches are both actuated such that torque from the differential housing 12 is transferred equally to the left and right axle shafts 30, 32. When the vehicle turns right, the left clutch is de-actuated while the right clutch remains actuated. In this state, the differential mechanism 38 continues to drive rotation of the right axle shaft 32 while the left axle shaft 30 is allowed to free wheel at a higher rate of rotation than the right axle shaft 32. When the vehicle makes a left turn, the right clutch is de-actuated while the left clutch remains actuated. In this state, the differential mechanism 38 continues to drive rotation of the left axle shaft 30 while the right axle shaft 32 is allowed to free wheel at a higher rotational speed than the left axle shaft 30.

The ring gear 14, pinion gear 16, and drive shaft 18 are shown in phantom in FIG. 1. The housing 12 may be composed of a first body 20 and a second body 22 that is fixedly mounted to the first body 20 via fasteners 24, such as bolts or any other suitable fastening mechanism. The ring gear 14 also may be mounted to the housing 12 via fasteners 26. Those skilled in the art will appreciate in light of the disclosure that follows that the housing 12 may be defined by any conventional structure known in the related art and that the present teachings are not limited to a housing as defined. Similarly, the housing 12 may be driven by any conventional drive mechanism known in the related art and that the present teachings are not limited to a housing that is driven via a ring gear, pinion gear, and drive shaft.

The first body 20 defines a hub 28 that supports one 32 of the pair of axle shafts 30, 32. Similarly, the second body 22 defines an opposed hub 34 that supports the other one 30 of the pair of axle shafts 30, 32. Together, the first body 20 and second body 22 of the housing 12 cooperate to define a cavity 36. As illustrated in FIGS. 1 and 2, the locking differential 10 also includes a differential mechanism, generally indicated at 38 and according to the present teachings, supported in the cavity 36 defined by the housing 12.

The differential mechanism 38 includes a pair of clutch members (e.g., left and right clutch members 40) disposed in spaced axial relationship with respect to one another. The clutch members 40 are operatively supported for rotation with the housing 12 and are co-axially aligned along the axis A. Left and right side gears 42, 44 (i.e., side hubs) are each operatively adapted for rotation with a corresponding one of the left and right axle shafts 30, 32. The side gears 42, 44 and axle shafts 30, 32 are co-axially aligned along the axis A. The side gears 42, 44 each define a plurality of splines 46 on the inner circumference thereof that are matingly received in corresponding splines defined on their corresponding axle shafts 30, 32. Left and right clutch mechanisms 48, 50 are operatively disposed between the clutch members 40 and their corresponding side gears 42, 44. When actuated, the clutch mechanisms 48, 50 are configured to transfer torque from the clutch members 40 to their respective side gears 42, 44 so as to resist or prevent relative rotation about the axis A between the clutch members 40 and their respective side gears 42, 44.

The side gears 42, 44 include a plurality of splines 52 on the outer circumferences thereof. The clutch mechanisms 48, 50 include a plurality of friction disks 54 that are cooperatively splined to the outer circumferences of the side gears 42, 44 and are rotatable therewith. Similarly, each of the clutch members 40 includes a plurality of splines 56 formed on the inner circumference thereof. A series of plates 58 have outer splines that engage the splined inner circumference 56 of the left and right clutch members 40. The plates 58 are interleaved between the friction disks 54 supported on the side gears 42, 44. The plates 58 and the friction discs 54 form clutch packs 59 (FIG. 6).

The clutch members 40 are axially moveable along the axis A within the housing 12 to engage/actuate their respective clutch mechanism 48, 50 by axially compressing together the plates 58 and friction discs 54 (i.e., the clutch packs 59). When the clutch mechanisms 48, 50 are actuated, torque is transferred from the clutch members 40, through the clutch packs 59, to the side gears 42, 44 and their corresponding axle shafts 30, 32. When both clutch mechanisms 48, 50 are fully actuated, the housing 12, the clutch members 40, the side gears 42, 44, and the axle shafts 30, 32 all rotate in unison with each other about the axis A. One representative example of the locking differential 10 of the type contemplated by the present teachings may also employ a plurality of biasing members (described below) to pre-load the clutch packs. Also, thrust washers may be provided at inboard and outboard sides of the clutch packs.

Figure 6:
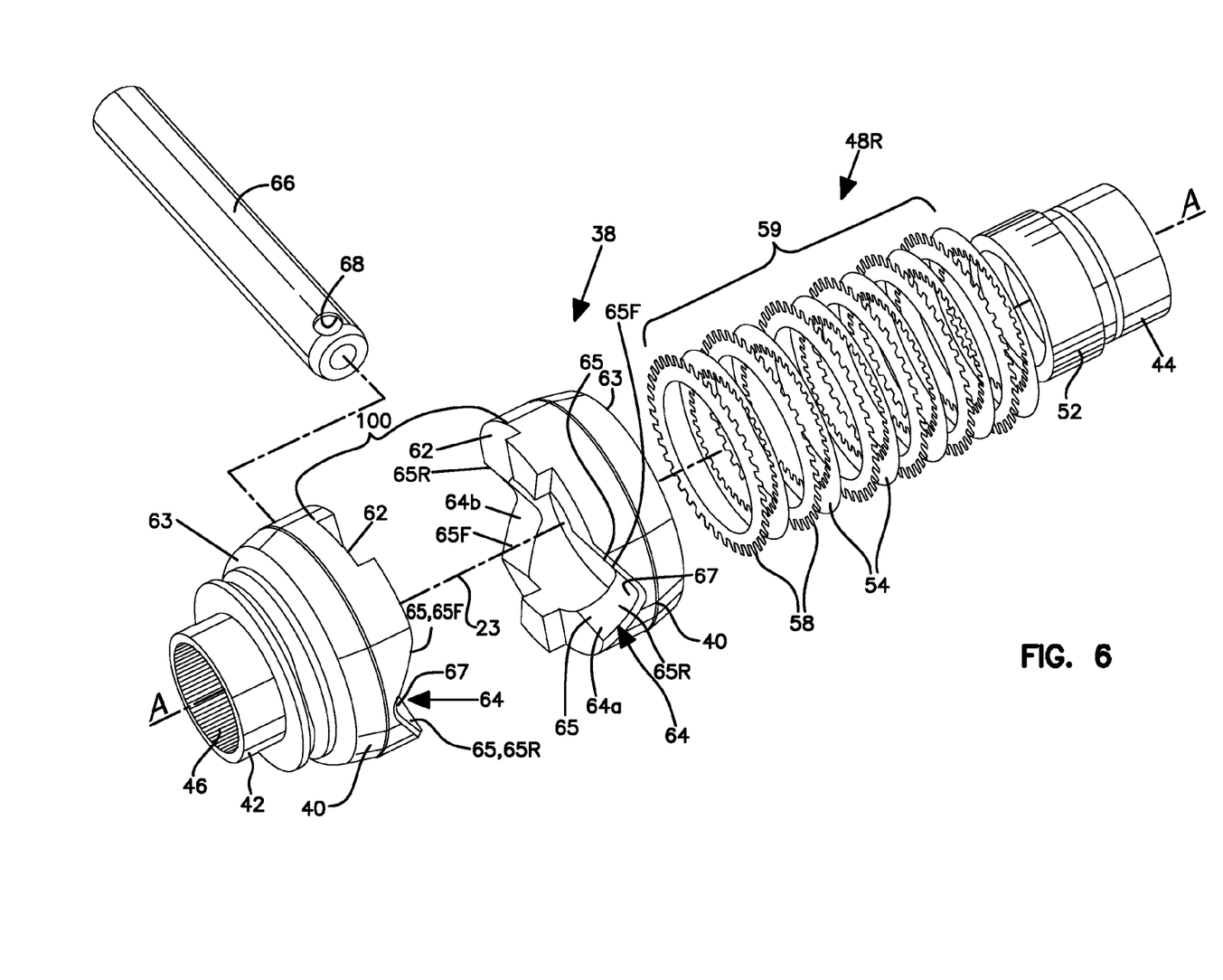
FIG. 6 is an exploded view showing the clutch members, side gears and one of the clutch packs of the locking differential of FIG. 1 with the springs and associated structure not depicted.

Referring to FIG. 6, the clutch members 40 present inwardly directed faces 62 (i.e., inboard sides) that face toward a cross shaft or pin 66 mounted between the clutch members 40. The clutch members 40 also include outwardly directed faces 63 (i.e., outboard sides) that face away from the pin 66. The inwardly directed faces 62 of the clutch members 40 oppose each other and are disposed in spaced axial relationship to one another. Each of the inwardly directed faces 62 of the clutch members 40 includes a groove 64 disposed in facing relationship with respect to the other. The cross pin 66 is received in the grooves 64 and is operatively connected for rotation with the housing 12 about the axis A. The cross pin 66 is generally cylindrical in shape and has an aperture 68 extending radially therethrough at one end. Opposite ends of the cross pin 66 can fit within corresponding radial openings defined by the housing 12 and the aperture 68 allows the cross pin 66 to be pinned in place relative to the housing 12 to prevent the cross pin 66 from sliding along its axis relative to the housing 12.

The grooves 64 are defined at the inwardly directed faces 62 of the clutch members 40. Each groove 64 is defined by ramp surfaces 65 that converge toward a neutral position 67. The neutral positions 67 form the deepest portions of the grooves 64. The clutch members 40 can rotate a limited amount relative to the cross pin 66 about the axis A between actuated positions where the cross pin 66 engages (e.g., rides on) the ramp surfaces 65 and non-actuated positions where the cross pin 66 is offset from the ramp surfaces 65 and aligns with the neutral positions 67. Each groove 64 includes two groove portions 64a, 64b (see FIG. 6) positioned on opposite sides of the axis A. Each groove portion 64a, 64b includes a forward ramp 65F and a rearward ramp 65R separated from one another by the neutral position 67. During normal forward driving conditions, the cross pin 66 engages the forward ramp surfaces 65F to force the clutch members 40 axially outwardly thereby actuating the clutch mechanisms 48, 50. During normal rearward driving conditions, the cross pin 66 engages the rear ramp surfaces 65R to force the clutch members 40 axially outwardly thereby actuating the clutch mechanisms 48, 50.

When the cross pin 66 is aligned with the neutral positions 67 of the grooves 64 of one of the clutch members 40, the corresponding clutch pack 59 is not axially compressed by the corresponding clutch member 40 and is therefore not actuated. When the clutch pack 59 is not actuated by its corresponding clutch member 40, only pre-load is applied to the clutch pack. In this non-actuated state, the clutch plates and the friction discs can rotate relative to one another during a wheel overspeed condition. Thus, during a wheel overspeed condition, the non-actuated clutch pack 59 corresponding to the overspeeding wheel permits the corresponding side gear 42, 44 and its corresponding axle shaft 30, 32 to rotate relative to the corresponding clutch member 40.

During normal straight driving conditions, the cross pin 66 engages the ramp surfaces 65 causing actuation of the clutch mechanisms 48, 50 such that the clutch packs 59 prevent relative rotation between the clutch members 40 and their corresponding side gears 42, 44. Thus, driving torque is transferred from the differential housing 12 and cross pin 66 through the clutch members 40, the clutch packs, and the side gears 42, 44 to the axle shafts 30, 32 and the wheels 17, 19. Thus, with both clutch packs 59 actuated, the differential housing 12, cross pin 66, the clutch members 40, the side gears 42, 44, the axle shafts 30, 32, and the wheels 17, 19 all rotate in unison about the axis A. During an overspeed condition (e.g., during a turn), the clutch member 40 corresponding to the overspeeding wheel rotates relative to the cross pin 66 such that the cross pin 66 disengages from the ramp surfaces 65 and becomes aligned with the neutral positions 67 thereby causing the corresponding clutch pack 59 to no longer be actuated. With the clutch pack 59 no longer actuated, only pre-load pressure is applied to the corresponding clutch pack. The pre-load pressure is sufficiently low that the de-actuated clutch permits relative rotation between the clutch member 40 and its corresponding side gear 42, 44 to accommodate the faster rotation of the overspeeding wheel relative to its corresponding clutch member 40, the cross pin 66 and the differential housing 12.

An intermating stop arrangement 100 defined between the inboard sides of the clutch members 40 allows for only a limited range of relative rotational movement between the clutch members 40 about the axis A. The stop arrangement 100 ensures that the clutch members 40 don't over-rotate their corresponding neutral positions 67 past the cross pin 66 during an overspeed condition. If the clutch members 40 were to over-rotate during an overspeed condition, the cross pin 66 would inadvertently actuate a de-actuated clutch by engaging the ramp 65F, 65R on the opposite side of the neutral position 67. The stop arrangement 100 prevents this from happening thereby allowing the overspeeding wheel to maintain an overspeed condition during a turn without interference from the clutch mechanisms 42, 44. The clutch pre-load is sufficiently high to provide the necessary slip resistance on the clutch packs 59 to energize the ramping effect of the clutch members to cross pin interface during clutch actuation.

In one representative example of the locking differential 10 of the type contemplated by the present teachings, the locking differential 10 includes a plurality of biasing members 70 (e.g., springs) that are disposed between the clutch members 40 and received in pockets or cavities 72 formed in the opposed clutch members 40 at the inboard sides of the clutch members 40 to urge the clutch members 40 away from one another. The biasing members 70 are depicted as compression springs having a plurality of coils 73. The biasing members 70 are made of a metallic material. The locking differential 10 also includes a plurality of wear pads 74 that are disposed in the cavities 72 between the end of the biasing members 70 and the clutch members 40 to preload the biasing members 70.

The wear pads 74 are generally or substantially cylindrical in shape. The wear pads 74 are made of a metallic material. The wear pads 74 have an enlarged head 76 which may include a recess 77. The wear pads 74 also have a shaft 78 extending axially from the head 76. Each wear pad 74 is disposed in a corresponding cavity 72 such that the shaft 78 extends into a bore 80 of the biasing member 70 and the head 76 abuts one of the coils 73 of the biasing member 70 and the opposed clutch member 40. It should be appreciated that, by placing the wear pads 74 at the end of the biasing members 70, the biasing members 70 are allowed to be acted upon by only a single clutch member 40. It should also be appreciated that the wear pad 74 is piloted within the bore 80 of the biasing member 70, which provides a "length over distance" advantage to prevent "shear" or "wedging" effects and allows for an intentional contact at the sliding interface between the clutch member 40 and the cross pin 66.

The wear pads 74 allow the biasing members 70 to apply a biasing load while remaining fully enclosed/contained within their corresponding cavities 72. The biasing forces from the biasing members 70 are transferred axially through the wear pads 74. The wear pads 74 traverse an interface gap between the clutch members 40. In this way, the biasing members 70 do not traverse the interface gap between the clutch members 40. Thus, the biasing members 70 are not exposed to side loads generated when the clutch members 40 rotate relative to one another about the axis A when one of the clutch members 40 encounters an overspeed condition. Instead, such side loading is applied to the wear pads 74.

The biasing members 70 function to provide pre-load that pre-compresses the clutch packs 59 to provide the necessary slip resistance to ensure proper actuation of the clutch packs 59. The pre-load provided by the biasing members 70 should be large enough such that the clutch packs 59 provide sufficient resistance to rotational movement of the clutch members 40 about the axis A for the cross pin 66 to ride up on the ramps 65 and cause actuation of the clutch mechanisms as differential housing 12 and the cross pin 66 carried therewith are rotated about the axis A during normal driving conditions. Also, the pre-load provided by the members 70 should not be so large so as to cause the wheels to slip/skid relative to the ground/road surface when encountering an overspeed wheel condition. In one example, the clutch pre-load applied to each clutch pack 59 allows the clutch packs 59 to transfer a pre-load torque value that is less than a representative wheel slip torque value corresponding to the outside wheel during a turn. The representative wheel slip torque value (i.e., the torque required to have the wheel slip relative to the ground) is dependent upon the gross weight of the vehicle and a selected coefficient of friction between the ground and the wheel that corresponds to a low traction condition.

Figure 4:
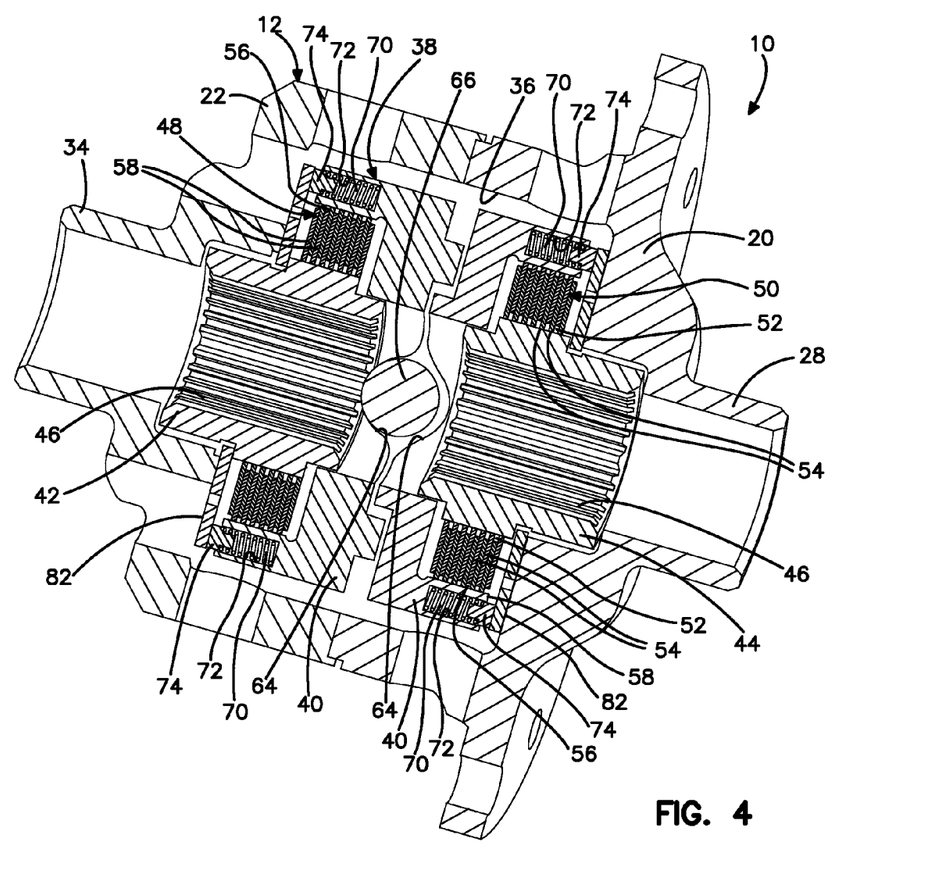
FIG. 4 is a fragmentary perspective view of another representative example of the differential mechanism with preload spring wear pads of the present teachings.
Figure 5:
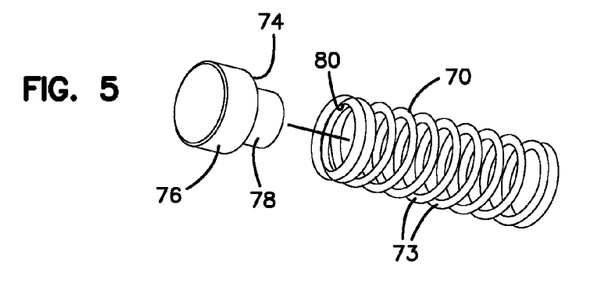
FIG. 5 is an exploded perspective view of the preload spring wear pad and spring arrangement of the present teachings.

As illustrated in FIG. 4, another representative example of the locking differential 10 is shown. Like parts have like reference numerals. The locking differential 10 includes the biasing members 70 disposed in the cavities 72 formed in the clutch members 40 on an outer axial surface thereof and between a thrust washer 82 splined to the side gears 42, 44. The locking differential 10 also includes the wear pads 74 disposed in the cavities 72 between the end of the biasing members 70 and the clutch members 40 to preload the biasing members 70. Each wear pad 74 is disposed in a corresponding cavity 72 such that the shaft 78 extends into the bore 80 of the biasing member 70 and the head 76 abuts one of the coils 73 of the biasing member 70 and the thrust washer 80. It should be appreciated that, by placing the wear pads 74 at the end of the biasing members 70, the biasing members 70 are allowed to be acted upon by only a single clutch member 40. It should also be appreciated that, as illustrated in FIG. 5, the head 76 of the wear pad 74 may be flat or planar.

The biasing members 70 in the example of FIG. 4 enhance noise/vibration/harshness (NVH) performance by biasing the clutch members 40 against the cross pin 66. In this way, the clutch members 40 have a pre-load acting on them, forcing maintained contact between the cross pin 66 and clutch members 40 and, in turn, preventing a "contact" noise during relative motion of the cross pin 66 and clutch members 40 during operation of the differential mechanism. The magnitude of the pre-load provided to the clutch members for NVH performance is coordinated with the pre-load provided to the clutch packs 59 to ensure that the pre-load applied to the clutch members 40 does not interfere with effective actuation of the clutch packs 59.

The present teachings have been described in great detail in the foregoing specification, and it is believed that various alterations and modifications of the many aspects of the present teachings will become apparent to those ordinary skilled in the art from a reading and understanding of the specification. It is intended that all such alterations and modifications are included in the present teachings, insofar as they come within the scope of the appended claims.

The following is a list of reference numerals used in the disclosure:

10 locking differential;
12 housing;
14 ring gear;
15 prime mover;
16 pinion gear;
17 left wheel;
18 drive shaft;
19 right wheel;
20 first body;
21 axle housing;
A axis of rotation;
22 second body;
24 fasteners;
26 fasteners;
28 hub;
30, 32 axle shafts;
34 hub;
36 cavity;
38 differential mechanism;
40 clutch members;
42, 44 side gears;
46 splines;
48, 50 clutch mechanisms;
52 splines;
54 friction disks;
56 splines;
58 plates;
59 clutch pack;
62 face;
64 groove;
64*a* groove portion;
64*b* groove portion;
65 ramp surfaces;
65F forward ramp;
65R rearward ramp;
66 cross pin;
67 neutral position;
70 biasing members;
72 cavities;
73 coils;
74 wear pads;
76 head;
77 recess;
78 shaft;
80 bore; and
82 thrust washer.

What is claimed is:

1. A differential for a vehicle comprising:
 a differential housing that is rotatable about an axis of rotation;
 clutch members positioned along the axis of rotation within the differential housing;
 side gears adapted for rotation with corresponding axle half shafts relative to the differential housing about the axis of rotation;
 a cross pin carried with the differential housing as the differential housing rotates about the axis of rotation;
 clutch mechanisms each including clutch packs for transferring torque between the clutch members and the side gears when actuated;
 the clutch members being axially moveable along the axis of rotation to actuate the clutch mechanisms, the clutch members presenting inwardly directed faces between which the cross pin is disposed, the inwardly directed faces defining opposing grooves in which the cross pin is received;

a pre-load spring positioned entirely within a cavity defined by one of the clutch members; and a wear pad positioned at one end of the pre-load spring, wherein pre-load from the pre-load spring is transferred through wear pad.

2. The differential of claim 1, wherein the pre-load spring functions to pre-load the clutch packs.

3. The differential of claim 2, wherein the wear pad traverses an interface gap between inboard sides of the clutch members.

4. The differential of claim 3, wherein the wear pad is biased against the inboard side of the other of the clutch members.

5. The differential of claim 1, wherein pre-load spring biases the clutch member against the cross pin.

6. The differential of claim 1, wherein the wear pad includes an enlarged head and a post, and wherein the post fits inside one end of the pre-load spring and the head extends at least partially out of the cavity.

7. A locking differential for a vehicle comprising:
a rotatable housing and a differential mechanism supported in said housing, said differential mechanism including a pair of clutch members disposed in spaced axial relationship with respect to one another and operatively supported for rotation with said housing;
a pair of side gears operatively adapted for rotation with a corresponding pair of axle half shafts, and a pair of clutch mechanisms operatively disposed between each corresponding pair of said clutch members and said side gears;
said clutch members being axially moveable within said housing to engage a respective one of said clutch mechanisms to couple the axle half shafts together;
each of said clutch members presenting an inwardly directed face, each said face including a groove disposed in facing relationship with respect to the other, and a cross pin received in each said groove and operatively connected for rotation with said housing; and
at least one biasing member disposed between said clutch members and at least one wear pad disposed at an end of said at least one biasing member to preload said at least one biasing member and to allow said at least one biasing member to be acted upon by only a single one of said clutch members.

8. A locking differential as set forth in claim 7 wherein said at least one wear pad is substantially cylindrical in shape.

9. A locking differential as set forth in claim 7 wherein said at least one wear pad has an enlarged head and a shaft extending axially from said head.

10. A locking differential as set forth in claim 9 wherein said at least one biasing member is a compression spring.

11. A locking differential as set forth in claim 10 wherein said clutch members include at least one cavity extending axially therein to receive said at least one biasing member.

12. A locking differential as set forth in claim 11 wherein said at least one wear pad is disposed between one end of said at least one biasing member and one of said clutch members.

13. A locking differential as set forth in claim 12 wherein said head is disposed at one end of said at least one biasing member and said shaft extends into a bore of said at least one biasing member.

14. A locking differential as set forth in claim 11 wherein said at least one cavity extends into an axial inner surface of one of said clutch members.

15. A locking differential as set forth in claim 11 wherein said at least one cavity extends into an axial outer surface of one of said clutch members.

16. A locking differential as set forth in claim 7 wherein said at least one wear pad is made of a metallic material.

17. A locking differential as set forth in claim 7 wherein said at least one biasing member is made of a metallic material.

18. A locking differential for a vehicle comprising:
a rotatable housing and a differential mechanism supported in said housing, said differential mechanism including a pair of clutch members disposed in spaced axial relationship with respect to one another and operatively supported for rotation with said housing;
a pair of side gears operatively adapted for rotation with a corresponding pair of axle half shafts, and a pair of clutch mechanisms operatively disposed between each corresponding pair of said clutch members and said side gears;
said clutch members being axially moveable within said housing to engage a respective one of said clutch mechanisms to couple the axle half shafts together;
each of said clutch members presenting an inwardly directed face, each said face including a groove disposed in facing relationship with respect to the other, and a cross pin received in each said groove and operatively connected for rotation with said housing; and
one of said clutch members having a plurality of cavities extending axially inward, a plurality of compression springs disposed in said cavities, and a plurality of wear pads disposed between one end of said compression springs and one of said clutch members to preload said compression springs.

19. A locking differential as set forth in claim 18 wherein each of said wear pads is substantially cylindrical in shape.

20. A locking differential as set forth in claim 18 wherein each of said wear pads has an enlarged head and a shaft extending axially from said head.

21. A locking differential as set forth in claim 20 wherein said compression springs have a plurality of coils forming a bore therein.

22. A locking differential as set forth in claim 21 wherein said wear pads are disposed between one end of said compression springs and one of said clutch members.

23. A locking differential as set forth in claim 22 wherein said head is disposed at one end of said coils and said shaft extends into said bore.

24. A locking differential as set forth in claim 20 wherein said cavities extend into an axial inner surface of one of said clutch members.

25. A locking differential as set forth in claim 20 wherein said cavities extend into an axial outer surface of one of said clutch members.

* * * * *